United States Patent [19]

Brothers et al.

[11] Patent Number: 4,500,357

[45] Date of Patent: Feb. 19, 1985

[54] OIL FIELD CEMENTING METHODS AND COMPOSITIONS

[75] Inventors: Lance E. Brothers, Lawton; S. Prabhakara Rao, Duncan, both of Okla.

[73] Assignee: Halliburton Company, Duncan, Okla.

[21] Appl. No.: 596,228

[22] Filed: Apr. 3, 1984

[51] Int. Cl.³ .............................................. C04B 7/35
[52] U.S. Cl. ..................................... 106/90; 106/315; 166/293; 166/294
[58] Field of Search .................. 106/90, 314, 315; 166/293, 294

[56] References Cited

U.S. PATENT DOCUMENTS

| | | | |
|---|---|---|---|
| 3,598,621 | 8/1971 | Ferrara | 106/111 |
| 3,723,145 | 3/1973 | Haldas et al. | 106/90 |
| 3,743,613 | 7/1973 | Coulter et al. | 260/17.4 ST |
| 3,748,159 | 7/1973 | George | 106/90 |
| 3,856,541 | 12/1974 | Martin | 106/90 |
| 3,954,489 | 5/1976 | Uchikawa et al. | 106/90 |
| 4,042,407 | 8/1977 | Natsuume | 106/90 |
| 4,120,736 | 10/1978 | Childs et al. | 106/90 |
| 4,125,410 | 11/1978 | Natsuume | 106/90 |
| 4,137,093 | 1/1979 | Poblano | 106/315 |
| 4,340,525 | 7/1982 | Hübner et al. | 106/315 |

FOREIGN PATENT DOCUMENTS

| | | | |
|---|---|---|---|
| 136158 | 10/1980 | Japan | 106/90 |
| 1473767 | 5/1977 | United Kingdom | 106/90 |

*Primary Examiner*—Winston A. Douglas
*Assistant Examiner*—Terryence Chapman
*Attorney, Agent, or Firm*—Thomas R. Weaver

[57] ABSTRACT

Cementing compositions and methods of using same in high temperature oil and gas well cementing operations are disclosed. Such compositions are comprised of fresh or salt water cement slurries, a water-soluble borate and particular terpolymers comprised of a strong acid monomer, a weak acid monomer and a nonionic monomer.

20 Claims, No Drawings

OIL FIELD CEMENTING METHODS AND COMPOSITIONS

BACKGROUND OF THE INVENTION

In oil field cementing operations a mixture of water, cement and particular additives are pumped down through the steel casing into the well bore and back up through the annulus around the casing to its desired position. Such action is known as primary cementing. The principal purposes of the primary cementing of oil and gas wells are to restrict fluid movement between formations and to bond and support the casing. To be useful as an oil field cement, a cementing composition must be designed to allow adequate placement time and have setting properties designed to resist gas leakage, loss of strength, and corrosive environmental elements. As the bottom hole circulating temperature (BHCT) of a well increases, slurry retardation and viscosity become more critical due to their effect on pumpability and compressive strength.

The present invention relates to cementing compositions and methods of cementing oil and gas wells and the like having a BHCT greater than about 200° F. using such compositions. More particularily, the present invention concerns incorporation of particular terpolymers and water soluble borates in hydraulic cement for the purpose of retarding the set time of such cement during cementing operations. The terpolymers of the present invention are comprised of about 10 to about 65 mole percent of a strong acid monomer selected from the group consisting of sodium vinylsulfonate, 2-acrylamido, 2-methyl propane sulfonic acid and vinyl benzene sulfonic acid; about 10 to about 60 mole percent of a weak acid monomer selected from the group consisting of acrylic acid, methacrylic acid, ethacrylic acid and vinyl acetic acid; and about 10 to about 60 mole percent of a nonionic monomer selected from the group consisting of acrylamide, N-vinylpyrrolidone and N,N dimethylacrylamide.

Certain polymer compositions have long been recognized by those skilled in the art of cementing wells in the petroleum industry as cementing additives useful in retarding the set time of cement and water. Such compositions are commonly referred to as "cement retarders." For example, lignosulfonic acid salts such as calcium lignosulfonate, are commonly used as cement retarders. However, such retarders are effective in BHCT temperature ranges up to only about 200° F. Additionally, many cementing compositions contain large amounts of salt. Salt causes cement to expand and also acts as a dispersant. Salt cement slurries help prevent sluffing when used with respect to shale and other salt-containing formations, as well as helping to prevent bridging and lost circulation. However, such salts tend to wash out the lignosulfonate thereby negating its set retardation characteristics.

When either salt cement slurries or fresh water cement slurries are prepared for cementing subterranean wellbores, it is often desirable to include various additives to tailor the cement slurry to specific well requirements. Such additives include accelerators, retarders, dispersants and fluid loss additives among others. Some of these additives have an effect on the properties of other additives and such effects must be taken into account when preparing the overall slurry.

To improve the performance of the lignosulfonic acid salts at higher temperatures, organic acids, such as gluconic acid, have been added. Further, as disclosed in U.S. Pat. No. 3,748,159, pentaboric acid salt has been combined with a lignosulfonic acid salt to produce a cement retarder for high temperature application. However, use of a lignosulfonic acid salt-organic acid-pentaboric acid salt containing composition may only be effectively used up to a temperature of about 450° F. As such temperature is approached, the amount of retarder needed to retard the cement for a sufficiently long period of time to allow placement is of such a quantity that sufficient compressive strength cannot be obtained in a reasonable period of time. Such compressive strength is generally considered to be about 500 psi to permit drilling out and the reasonable period of time is considered to be approximately 24 hours. Additionally, organic acids, such as gluconic acid, act as strong retarders and are temperature sensitive. Such organic acids can only be used when the well formation temperature is sufficiently high so as to overcome such retarder characteristics. Such minimum BHCT is about 200° F.

U.S. Pat. No. 4,340,525 discloses certain copolymers and terpolymers for use in deep-well cementing operations. Such copolymers comprise 1-60 mole percent of anionic structural units and about 99-40 mole percent of nonanionic structural units. The terpolymers further include 10 mole percent of a water soluble monomer selected from the group consisting of vinyl sulfonic acid, vinylpyrolodone, esters of amino alcohols and acrylic acids, esters of amino alcohols and methacrylic acid and acrylic acid, amidosulphonic acid. A preferred terpolymer includes acrylamide, sodium acrylate and sodium vinylsulfonate. However, such compositions when used in conjunction with fresh water cement slurries tend to form stiff gels at a temperature above 200° F. Additionally, such terpolymers when used in saturated salt cement slurries tend to lose effectiveness at temperatures well below 400° F. This is also due to the requirement that large amounts of the terpolymer be included to effect retardation thereby preventing the development of sufficient compressive strength within a reasonable period of time after placement.

Hence, the industry desires a cement retarder that will retard the set time of cement under high temperature (above 400° F.) conditions for a sufficient period of time so as to permit placement of such cement during cementing operations, permit the development of adequate compressive strength within a reasonable period of time (24 hours), is salt tolerable (i.e. does not exhibit substantial loss of effectiveness in the presence of salt), is chemically stable during cementing operations, and has as little effect on viscosity as possible. Such a cement retarder should be compatible with as many other additives and environmental conditions as possible and should be soluble in cement slurries at normal ambient temperature conditions encountered during oil well cementing operations.

SUMMARY OF THE INVENTION

Cementing compositions for use in high temperature oil and gas well cementing operations are disclosed. More particularly, such compositions are comprised of fresh or salt-containing water, hydraulic cement, a water-soluble form of borate, and a terpolymer having a strong acid group, a weak acid group, and a nonionic group. The strong acid group is present in an amount of about 10-65 mole percent and is selected from the group consisting of sodium vinylsulfonate; 2-acrylamido, 2- methyl propane sulfonic acid; and vinyl benzene sulfonic acid. The weak acid group is present in an amount of about 10-60 mole percent and is selected from the group consisting of acrylic acid, methacrylic acid, ethacrylic acid and vinyl acetic acid. Finally, the nonionic group is present in an amount of about 10-60 mole percent and is selected from the group consisting of acrylamide, N-vinylpyrrolidone, and N,N dimethylacrylamide. Such terpolymer has an average molecular weight of between about 10,000 and about 100,000. Such terpolymer, as well as the water-soluble borate, may be admixed in solid form with any dry hydraulic oil field cement or may be added at the time the cement slurry is being prepared, either to the mixing water or to the slurry. Additionally, methods of cementing a conduit in a borehole penetrating an earthen formation by introducing such a cementing composition into the space between such conduit and the formation are disclosed.

So that the above-recited features, advantages and objects of the inventions, as well as others which will become apparent, are attained and can be understood in detail, more particular description of the invention is set forth below with respect to typical embodiments thereof, but the described embodiments should not be considered limiting of it's scope, for the invention may admit of other equally effective embodiments which will be apparent from the description to one of ordinary skill in the art.

DESCRIPTION OF THE PREFERRED EMBODIMENTS

By the present invention, certain synthetic terpolymers and a water-soluble borate are combined with a salt cement slurry for use in high temperature oil and gas well cementing operations. Such combination produces a cementing composition that has sufficient retardation properties to allow placement of same in oil and gas wells characterized by high bottom hole circulating temperatures (i.e. temperatures above 400° F., while still producing a 24-hour compressive strength above 500 psi).

In oil and gas well cementing operations, it is generally desirable to have a pumpable slurry for between 4 and 6 hours, depending on the depth of the well, to permit sufficient time to complete the pumping operations. Further, if the cement slurry is over-retarded, the cement may not set, or only set after a usually long period of time. Generally, a set time of less than 24 hours is desired. Set time is defined as achieving a compressive strength of at least 500 psi.

Certain pumpability and set parameters may be achieved by employing a cementing composition comprising salt or fresh water, cement, and certain terpolymers in an amount of about 0.1-3 percent by weight of cement. Such a composition will be useful as an oil well cementing composition in oil and gas wells having a bottom hole circulating temperature of up to 270° F. in fresh water slurries and up to about 430° F. in salt water cement slurries. The amount of salt generally present will be from 5 and 37.2 (saturation) percent salt by weight of water. Typically, the salts included will be inorganic salts, with potassium chloride and sodium chloride the most preferred due to availability. The amount of salt present has a directly proportional effect with respect to increasing or extending the effective temperature range. The inclusion of a water-soluble borate has been found to extend the BHCT effective range for such compositions made with fresh water slurries to about 350° F., and extends the BHCT effective range for such compositions made with saturated salt water to a range of over 500° F. The water-soluble borate is preferably present in an amount of between 0.1%-3% by weight of cement. Such compositions are used to cement a conduit penetrating an earthen formation via introducing such composition into the space between such conduit and such formation and allowing the composition to harden.

The terpolymer is comprised of three monomers: a strong acid monomer, a weak acid monomer and a nonionic monomer. The strong acid monomer preferably contains a sulfonic acid group, such as 2-acrylamido, 2-methyl propane sulfonic acid, sodium vinylsulfonate, or vinyl benzene sulfonic acid. The most preferred strong acid monomers are 2-acrylamido, 2-methyl propane sulfonic acid and sodium vinylsulfonate. One would expect that a phosphonic group could be substituted for the sulfonic group, such as phosphonic analogs of sulfonic acid where there is chemical modification of the monomer by phosphonation. The strong acid monomer is preferably present in the terpolymer in an amount of about 10 to about 65 mole percent.

The second terpolymer component is a weak acid monomer such as a carboxylic acid. More preferably, the weak acid monomer is selected from the group consisting of acrylic acid, methacrylic acid, ethacrylic acid, and vinyl acetic acid. The most preferred weak acid monomer is acrylic acid. Such weak acid monomer is preferably present in the terpolymer by an amount of about 10 to about 60 mole percent.

The nonionic monomer must be water-soluble, and is preferably selected from the group consisting of acrylamide, N,N dimethylacrylamide, and N-vinylpyrrolidone. The most preferred nonionic monomer is N,N dimethylacrylamide. The nonionic monomer is preferably present in the terpolymer in an amount of about 10 to about 60 mole percent.

The terpolymer should have a molecular weight of less than about 100,000. A preferred molecular weight range is between about 25,000 and about 100,000. The most preferred molecular weight range is between about 50,000 and about 80,000. As the molecular weight of the terpolymer increases about above 100,000, certain flocculant properties are evidenced. These flocculant properties cause increased slurry viscosity resulting in pumpability problems. Additionally, higher molecular weight terpolymers create transport and storage problems. For example, the lower molecular weight terpolymers (i.e. under 100,000) can act as a thinning agent and are more easily made at higher solution concentrations, such as 40 percent by weight of water, which is more economical for transport and storage than say for example a 10 percent solution. It is well known that the higher the molecular weight of the terpolymer the more difficult it is to place such terpolymer into solution. Additionally, there is a lower threshold of molecular weight which is found at about 10,000. Below this threshold level there is insufficient interaction with the cement particles to effectively retard the setting time of the cement slurry.

The water-soluble borate may be any of the alkali metal pentaborates or alkaline metal pentaborates. However, the sodium, lithium, ammonium and potassium pentaborates are preferred due to better solubility. One preferred water-soluble borate is sodium tetraborate decahydrate, which is also known as sodium borate and still more commonly known as borax. A more preferred water-soluble borate is potassium pentaborate.

Although the terpolymers used in the present invention may be manufactured in accordance with various well known techniques, an example of terpolymer synthesis is as follows:

Sodium vinylsulfonate (1.2 L) was placed in a two liter polymerization reactor, followed by acrylamide (177.2 gms) and acrylic acid (90 gms). The contents were stirred until a uniform solution was obtained. The polymer solution was thermostated at 45° C., flushed 30 minutes with nitrogen, and a specified quantity of a two-component catalyst system was added. The first component of the catalyst system was sodium persulfate (a 30 ml solution containing 10 gms), followed by the second component, sodium sulfite (a 30 ml solution containing 10 gms). Polymerization was allowed to proceed at 45° C. in nitrogen atmosphere with continuous stirring for 24 hours. The resultant aqueous solution was in an amount of 1.2–1.5 liters and was assumed to have a 100 percent conversion of the monomers to polymer. The concentration of the polymer solution was specified on the basis of the weight of the monomers taken initially. The composition is as follows: 25 mole percent sodium vinylsulfonate, 50 mole percent acrylamide, and 25 mole percent acrylic acid.

A series of polymers were synthesized using the technique described in the example. The quantities of the monomers in terms of weight and mole percent, catalyst, reaction temperature, and time are listed in TABLE I. After the reaction, the polymer from the aqueous solution was either isolated by precipitation in a nonsolvent (methanol or acetone) or was sampled as an aqueous solution. The conversion of the monomers to polymer was assumed to be 100 percent, and the concentration of the polymer solution was specified on the basis of the weight of the monomers taken initially.

nating in partial gelation. This partial gelation was exhibited by cement chunks or plugs observed in the cement during viscosity measurement.

Anionic polymers such as polyacrylic acid are in a rigid rod-like configuration in low ionic, aqueous environment where the pH is greater than 7. This is believed to be due to intramolecular charge repulsion. When ionic strength in the solution is sufficient to shield the charges, the polymer assumes a coiled configuration. RA2-5 shows acceptable response in fresh water slurries up to 206° F. and in slurries containing a minimum of 5% NaCl by weight of water at temperatures up to about 400° F. What is postulated is that the coiled configuration of the polymer gives the maximum coverage of the cement grain. When the salt cement slurries hydrate and set by whatever mechanism, they have been retarded by having the grains uniformly covered by the coiled polymer. Since RA2-5 is 32 percent acrylamide, its nonionic, random grouping in the polymer allows for some charge shielding permitting the polymer to assume a somewhat coiled configuration even in a moderate ionic environment such as a fresh water cement slurry. However, at approximately 215° F., the amide hydrolyzes and effectively removes the charge shielding. At such high temperature, the polymer uncoils to assume the rod configuration, permitting only partial cement grain coverage. Some of the active sites on the cement grain are then exposed to a 200° F.+ aqueous environment and begin to hydrate, resulting in a partial gelation of the cement slurry which is in turn reflected by a viscosity increase in viscosity measurement test. As the test continues, the remainder of the slurry sets which encases the previously, partially hydrated slurry. This results in a cement plug encased in a sheath of hardened cement.

To prevent this base hydrolysis, a less easily hydrolyzable nonionic group was substituted for the amide. This nonionic monomer was N,N dimethylacrylamide. The rate of hydrolysis of this neutral monomer was

TABLE I

REACTION CONDITIONS FOR THE POLYMERIZATION OF MONOMERS

| Sample | Polymer | Composition of Reaction Mixture | | | Mole % | | | Catalyst $Na_2S_2O_8/Na_2SO_3$ (g) | Volume of Reaction Mixture |
|---|---|---|---|---|---|---|---|---|---|
| | | $M_1$ (L) | $M_2$ (g) | $M_3$ (ml) | $M_1$ | $M_2$ | $M_3$ | | |
| RA2-1 | Poly(SVS) | SVS (0.6) | — | — | 100 | — | — | 6/6 | 665 ml* |
| RA2-2 | Poly(SVS) | SVS (0.6) | — | — | 100 | — | — | 6/6 | 665 ml** |
| RA2-3 | Poly(SVS/AM/AA) | SVS (0.6) | AM (25) | AA (25) | 62.1 | 19.08 | 18.85 | 6/6 | 0.6 L |
| RA2-4 | Poly(SVS/AM) | SVS (1.2) | AM (162.2) | — | 50 | 50 | — | 10/10 | 1.36 L |
| RA2-5 | Poly(SVS/AM/AA) | SVS (1.2) | AM (116) | AA (58) | 48.3 | 34.45 | 17.2 | 10/10 | Yield:470 g 1.31 L |
| RA2-6 | Poly(SVS/AM/AA) | SVS (1.2) | AM (58) | AA (116) | 48.5 | 17.31 | 34.15 | 10/10 | Yield:430 g 1.31 L |
| RA2-7 | Poly(SVS/AM/AA) | SVS (1.2) | AM (58) | AA (58) | 58.5 | 20.87 | 20.56 | 10/10 | Yield:425 g 1.25 L |
| RA2-8 | Poly(SVS/AM/AA) | SVS (1.2) | AM (177.2) | AA (90) | 25.0 | 49.8 | 25 | 10/10 | Yield:390 g 1.2 L |
| RA2-9 | Poly(SVS/AM/AA) | SVS (0.432) | AM (195.5) | AA (138.7) | 15 | 50 | 35 | 10/10 | 1.2 L |
| RA2-10 | Poly(AM/AA) | — | AM (284) | AA (144) | — | 66 | 33 | 15/10 | 1.5 L |

*Reaction mixture includes 65 ml of ethanol.
**Reaction mixture includes 65 ml of methanol.
ABBREVIATIONS:
SVS = sodium vinyl sulfonate (25% aq. soln.)
AM = acrylamide
AA = acrylic acid
All polymerizations were conducted at 45° C. for 24 hours under nitrogen atmosphere.

The polymers from TABLE I were tested for various properties relevant to their use as cement retarders. Sample RA2-5 was selected for additional testing. It was noted that in the temperature range of 210° to 220° F., fresh water slurries retarded with the RA2-5 terpolymer showed fluctuating viscosity readings culminating found to be much slower than that of the unsubstituted amide.

Another method of eliminating fresh water gelation was discovered. This method was the inclusion of potassium pentaborate in such fresh water slurries. Test results using sample RA2-5 and potassium pentaborate are provided in TABLE II. (The tests performed in TABLES II-V were conducted in accordance with the *API Specification for Materials and Testing for Well Cement,* first edition (1982), published by the American Petroleum Institute, Washington, D.C. Compressive strength tests were performed in accordance with Section 7 of the reference and the thickening time tests were conducted in accordance with Section 8 of the reference. The pertinent portions of this reference are hereby incorporated by reference.) The results found in this table indicate that fresh water slurries comprised of water, hydraulic cement, potassium pentaborate and the terpolymer sample RA2-5, extended thickening times to a temperature of at least 300° F. In the slurry that plugged, the viscosity increase did not occur until the slurry had reached 300° F., well beyond the range where previous plugging problems had occurred. When the borate level was increased to 0.75 percent, the cement obtained a uniform set after 3 hours and 9 minutes.

TABLE II

EFFECT OF VARYING CONCENTRATIONS OF POTASSIUM PENTABORATE ON RETARDATION PROPERTIES OF RA2-5 AT 300° F. BHCT
Class H Cement, 35% Finely Divided Silicate Flour, 1% RA2-5, 5.9 gal of water/sk (The weight percentages are based on one 94 lb. sack of cement)

| Addition Level of Potassium Pentaborate (% by wt. of cement) | Thickening Time 18,000 ft API Casing Schedule 300° F. BHCT hrs:min |
|---|---|
| 0.5 | 1:31 (plugged) |
| 0.75 | 3:09 |
| 1.0 | 5:00+ |

The thickening times were found to be further extended when potassium pentaborate and terpolymer RA2-5 were combined with a salt cement slurry. TABLE III indicates the effect that salt concentration has on cement slurries containing potassium pentaborate and the terpolymer sample RA2-5. One thickening time determination at 450° F. was found to be 4 hours and 3 minutes. A repeat test was run and a thickening time of over 7 hours was obtained. A compressive strength test was conducted for an identical slurry. The 24-hour results indicate a compressive strength development of 4,650 psi at 450° F. At a temperature of 500° F., a cement slurry containing a 3% level of both the terpolymer sample RA2-5 and potassium pentaborate was evaluated and found to still be pumpable after 7 hours.

Terpolymer sample RA2-5 was evaluated as to its Brookfield viscosity using the RVT UL Adapter Spindle. The results for a 10% aqueous solution at ambient temperature were as follows:

| RPM of Spindle | Viscosity in Centipoise |
|---|---|
| 2.5 | 0.5 |
| 5 | 1 |
| 10 | 2.2 |
| 20 | 4.0 |
| 50 | 10.6 |

A second high temperature evaluation of a saturated salt slurry containing terpolymer sample RA2-5, potassium pentaborate, plus other additives was conducted with the results provided in TABLE IV. Such results indicate that the water-soluble borate (potassium pentaborate) extends the effective temperature range of a saturated salt slurry containing the terpolymer sample RA2-5. This slurry without the water-soluble borate pumped for a period of 1 hour and 27 minutes, whereas when the borate was provided in an amount equal to that of the terpolymer, a pumping time of over 6 hours and 30 minutes was obtained. When the amount of borate concentration was reduced to a ratio of 0.5:1 borate to polymer, a thickening time of 4 hours and 36 minutes was obtained. To insure that the gluconic acid was not producing the retardation, the gluconic acid was omitted from the two final tests. In these tests the thickening times obtained were 5 hours and 16 minutes and 6 hours and 10 minutes respectively. Clearly, the gluconic acid was not producing the retardation.

TABLE IV

Thickening Times at 415° F.
Parameters held constant were:
Class H Cement, 73 lb/sk Hematite, 35% Fine Silica Flour, 1.5% RA2-5, 1.5% Fluid Loss Additive.
6.8 gal of water/sk, saturated salt.
(Slurry density is 19 lbs/gal)
(All amounts are based on one 94 lb/sack of cement)
Time to BHCT: 42 minutes

| Gluconic Acid (% by wt. of cement) | Potassium Pentaborate (% by wt. of cement) | Thickening Time (hrs:min) |
|---|---|---|
| 0 | 0 | 1.27 |
| 1 | 0 | 1:35 |
| 1 | 1.5 | 6:30+ |
| 1 | 0.75 | 4:36 |
| 0 | 0.75 | 5:16 |
| 0 | 0.75 | 6:10 |

The effect of salt on the retardation properties of a second terpolymer sample (RA2-8) was determined with the results provided in TABLE V. All slurries

TABLE III

High Temperature Application of RA2-5
Parameters held constant were:
Class H Cement, 73 lb/sk Hematite, 35% Fine Silica Flour, 1.5% Fluid Loss Additive, 6.8 gal of water/sk, saturated salt, (Slurry Density 19 lbs/gal.)
(All amounts are based on one 94 lb. sack of cement)

| RA2-5 (% by wt. of Cement) | Potassium Pentaborate (% by wt. of Cement) | Thickening Time at 450° F. BHCT (hrs:min) | Thickening Time at 500° F. BHCT (hrs:min) | 24 Hr. Compressive Strength at 450° F. 3000 psi (psi) |
|---|---|---|---|---|
| 1.5 | 1.5 | 7:30+ | 2:40 | NT |
| 1.5 | 1.1 | 8:00+ | NT | NT |
| 1.5 | 1.0 | 4:03(7:00+)[1] | NT | 4650 |
| 3.0 | 3.0 | NT | 7:30+ | NT |

[1]Repeat Test
NT = Not Tested contained 20% borax by weight of retarder. The RA2-8 consists of 25 mole percent sodium vinylsulfonate, 50 mole percent acrylamide and 25 mole percent acrylic acid. The results show the versatility of the composition, in that variation of the water-soluble borate and the monomer ratio of the terpolymer critically affect the effective temperature range of the composition. Hence, this effective temperature range can be varied from 200° F. to above 500° F.

An additional thickening time test was conducted for a terpolymer sample comprised of 50 mole percent acrylic acid, 33 mole percent N,N dimethylacrylamide, and 17 mole percent 2-acrylamido, 2-methyl propane sulfonic acid. Thickening time test conditions consisted of raising the temperature of the cement slurry to a simulated BHCT of 450° F. over a period of 60 minutes. The cement slurry was comprised of Class H cement, 35% silica flour by weight of cement, 1.5% terpolymer by weight of cement, 1% potassium pentaborate by weight of cement and 6.1 gallons of water per sack of cement. In testing two such cementing compositions, the time required to reach consistency of 70 BC as determined on a Halliburton Consistometer, was 6 hours and 47 minutes and 6 hours and 9 minutes per respective test.

TABLE V

EFFECT OF SALT ON RETARDATION PROPERTIES OF RA2-8 AT VARIOUS TEMPERATURES
Class H Cement, 35% Fine Silica Flour, 6.1 gal of water/sk
(The weight percentages of the additive is based on one 94 lb/sack of cement)

| Addition Level of RA2-8 (% by wt. of cmt.) | NaCl (% by wt. of water) | Thickening Time | | |
|---|---|---|---|---|
| | | 14,000 ft API Casing Schedule 206° F. BHCT (hrs:min) | Modified 15,000 ft Casing Schedule 220° F. BHCT (hrs:min) | 16,000 ft API Casing Schedule 248° F. BHCT (hrs:min) |
| 0.1 | 37.2 | 1:36 | — | — |
| 0.2 | 0 | 3:22 | — | — |
| 0.2 | 37.2 | — | 5:30+(3:50) | 3:30 |
| 0.3 | 0 | 4:42(4:57)[2] | — | — |
| 0.3 | 37.2 | — | — | 7:30+ |
| 0.4 | 0 | 6:24 | 5:10 | — |
| 0.5 | 0 | — | 4:35 | — |
| 0.5 | 37.2 | — | — | 17:00+ |
| 0.7 | 0 | — | — | 3:14 |
| 1.0 | 0 | — | — | 5:30(4:10) |

[1] All slurries contain 20% borax by weight of retarder
[2] Times in parenthesis are repeat tests Hence, the particular terpolymers and water-soluble borate cement additives of the present invention are particularly suited for use in cement slurries introduced in high temperature oil and gas well cementing operations. Such additives are especially suited for inclusion in salt cement slurries where the salt content in the water is in an amount of from about 5% by weight of water to saturation (37.2% by weight of water). Such cement slurries are prepared by dry blending the additives, including the salt and cement and then mixing same with water. This permits easy storage and facilitates mixing since various other cement additives are often dry blended at the operations site. However, an alternative method of mixing would be to prepare a solution to use as a liquid additive. This liquid additive could then be blended with the mixing water or directly with the slurry.

What is claimed is:

1. A cementing composition for use in cementing operations for oil and gas wells having bottom hole circulating temperatures above about 200° F. comprising a salt water cement slurry, a water soluble form of borate, and a terpolymer, wherein said terpolymer is comprised of about 10-65 mole precent of a strong acid monomer selected from the group consisting of sodium vinylsulfonate, 2-acrylamido, 2-methyl propane sulfonic acid, and vinyl benzene sulfonic acid; about 10-60 mole percent of a weak acid monomer selected from the group consisting of acrylic acid, methacrylic acid, ethacrylic acid and vinyl acetic acid; and about 10-60 mole percent of a nonionic monomer selected from the group consisting of acrylamide, N-vinylpyrrolidone and N,N dimethylacrylamide; wherein the average molecular weight of said terpolymer is between about 10,000 and about 100,000.

2. The composition of claim 1 wherein said borate is present in an amount of between about 0.1% and about 3% by weight of cement.

3. The composition of claim 2 wherein said terpolymer is present in an amount of between about 0.1% to about 3% by weight of cement.

4. The composition of claim 3 wherein said average molecular weight is between 50,000 and 80,000.

5. The composition of claim 4 wherein said nonionic monomer is N,N dimethylacrylamide, said weak acid monomer is acrylic acid, and said strong acid monomer is selected from tne group consisting of 2-acrylamido, 2-methyl propane sulfonic acid and sodium vinylsulfonate.

6. A cementing composition for use in cementing operations for oil and gas wells having bottom hole circulating temperatures above about 200° F. comprising a fresh water cement slurry, a water soluble form of borate, and a terpolymer; wherein said terpolymer is comprised of about 10-65 mole percent of a strong acid monomer selected from the group consisting of sodium vinylsulfonate, 2-acrylamido, 2methyl propane sulfonic acid, and vinyl benzene sulfonic acid; about 10-60 mole percent of a weak acid monomer selected from the group consisting of acrylic acid, methacrylic acid, ethacrylic acid and vinyl acetic acid; and about 10-60 mole percent of a nonionic monomer selected from the group consisting of acrylamide, N-vinylpyrrolidone and N,N dimethylacrylamide; wherein the average molecular weight of said terpolymer is between about 10,000 and about 100,000.

7. The composition of claim 6 wherein the strong acid monomer is selected from the group consisting of sodium vinylsulfonate and 2-acrylamido, 2-methyl propane sulfonic acid, said weak acid monomer is acrylic acid and said nonionic monomer is N,N dimethylacrylamide.

8. The composition of claim 7 wherein wherein the average molecular weight of said terpolymer is between 50,000 and 80,000.

9. The composition of claim 8 wherein said borate is present in an amount of between about 0.1% and about 3% by weight of cement.

10. The composition of claim 9 wherein said terpolymer is present in an amount of between about 0.1% to about 3% by weight of cement.

11. A method of cementing a conduit in a borehole penetrating an earthen formation having a bottom hole circulating temperature above about 200° F. by introducing a cementing composition into the space between said conduit and said formation and allowing said composition to set wherein said cementing composition is comprised of a salt water, cement slurry, a water-soluble form of borate in an amount of from about 0.1% to about 3% by weight of cement, and from about 0.1% to about 3% by weight of cement of a terpolymer, wherein said terpolymer is comprised of from about 10–65 mole percent of a strong acid monomer selected from the group consisting of sodium vinylsulfonate, 2-acrylamido, 2-methyl propane sulfonic acid, and vinyl benzene sulfonic acid; about 10–60 mole percent of a weak acid monomer selected from the group consisting of acrylic acid, methacrylic acid, ethacrylic acid and vinyl acetic acid; and about 10–60 mole percent of a nonionic monomer selected from the group consisting of acrylamide, N-vinylpyrrolidone and N,N dimethylacrylamide; wherein the average molecular weight of said terpolymer is between about 10,000 and about 100,000.

12. The method of claim 11 wherein said borate is present in an amount of between about 0.1% and about 3% by weight of cement.

13. The method of claim 12 wherein said terpolymer is present in an amount of between about 0.1% to about 3% by weight of cement.

14. The method of claim 13 wherein said average molecular weight is between 50,000 and 80,000.

15. The method of claim 14 wherein said nonionic monomer is N,N dimethylacrylamide, said weak acid monomer is acrylic acid, and said strong acid monomer is selected from the group consisting of 2-acrylamido, 2-methyl propane sulfonic acid and sodium vinylsulfonate.

16. A method of cementing a conduit in a borehole penetrating an earthen formation having a bottom hole circulating temperature above about 200° F. by introducing a cementing composition into the space between said conduit and said formation and allowing said composition to set wherein said cementing composition is comprised of a fresh water cement slurry, a water-soluble form of borate in an amount of from about 0.1% to about 3% by weight of cement, and from about 0.1% to about 3% by weight of cement of a terpolymer, wherein said terpolymer is comprised of from about 10–65 mole percent of a strong acid monomer selected from the group consisting of sodium vinylsulfonate, 2-acrylamido, 2-methyl propane sulfonic acid, and vinyl benzene sulfonic acid; about 10–60 mole percent of a weak acid monomer selected from the group consisting of acrylic acid, methacrylic acid, ethacrylic acid and vinyl acetic acid; and about 10–60 mole percent of a nonionic monomer selected from the group consisting of acrylamide, N-vinylpyrrolidone and N,N dimethylacrylamide; wherein the average molecular weight of said terpolymer is between about 10,000 and about 100,000.

17. The method of claim 16 wherein the strong acid monomer is selected from the group consisting of sodium vinylsulfonate and 2-acrylamido, 2-methyl propane sulfonic acid, said weak acid monomer is acrylic acid and said nonionic monomer is N,N dimethylacrylamide.

18. The method of claim 17 wherein wherein the molecular weight of said terpolymer is between 50,000 and 80,000.

19. The method of claim 18 wherein said borate is present in an amount of between about 0.1% and about 3% by weight of cement.

20. The method of claim 19 wherein said terpolymer is present in an amount of between about 0.1% to about 3% by weight of cement.

* * * * *